(12) United States Patent
King

(10) Patent No.: US 12,305,887 B2
(45) Date of Patent: May 20, 2025

(54) METHOD, SYSTEM AND TEMPERATURE CONTROL OF A HEATING, VENTILATION AND AIR CONDITIONING UNIT

(71) Applicant: Carrier Corporation, Palm Beach Gardens, FL (US)

(72) Inventor: David R. King, Brownsburg, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 222 days.

(21) Appl. No.: 17/247,686

(22) Filed: Dec. 21, 2020

(65) Prior Publication Data

US 2021/0222914 A1 Jul. 22, 2021

Related U.S. Application Data

(60) Provisional application No. 62/963,401, filed on Jan. 20, 2020.

(51) Int. Cl.
| | |
|---|---|
| *F24H 9/00* | (2022.01) |
| *F24H 3/00* | (2022.01) |
| *F24H 9/20* | (2022.01) |
| *F24H 15/176* | (2022.01) |
| *F24H 15/20* | (2022.01) |
| *F24H 15/25* | (2022.01) |
| *F24H 15/31* | (2022.01) |

(Continued)

(52) U.S. Cl.
CPC ........... *F24H 9/2085* (2013.01); *F24H 3/006* (2013.01); *F24H 15/176* (2022.01); *F24H 15/20* (2022.01); *F24H 15/25* (2022.01); *F24H 15/31* (2022.01); *F24H 15/345* (2022.01); *F24H 15/36* (2022.01); *F24H 15/429* (2022.01); *G05B 15/02* (2013.01); *F24H 15/281* (2022.01)

(58) Field of Classification Search
CPC ....... F24H 9/2085; F24H 3/006; G05B 15/02; F23N 5/022
See application file for complete search history.

(56) References Cited

U.S. PATENT DOCUMENTS 4,951,870 A * 8/1990 Ballard .................. F23N 5/242
236/11
5,535,501 A * 7/1996 Hoeffken ................ F24H 15/36
29/521

(Continued)

FOREIGN PATENT DOCUMENTS

| CA | 2762499 A1 * 10/2012 | .......... A01M 1/2094 |
| GB | 2564888 A | 1/2019 |

(Continued)

OTHER PUBLICATIONS

English Translation of "JP-3124870-U" (Year: 2006).*

*Primary Examiner* — Charles R Kasenge
(74) *Attorney, Agent, or Firm* — Souad Hakim

(57) ABSTRACT

A method of controlling the temperature within a heating apparatus for eliminating or reducing combustion resonance, the method including measuring a temperature of the burner assembly; comparing the measured temperature with a predetermined temperature limit or range; determining whether the measured temperature is greater than a predetermined temperature limit or range; performing a controlled action if the measured temperature is greater than the predetermined temperature limit or range.

13 Claims, 3 Drawing Sheets

(51) Int. Cl.
*F24H 15/345* (2022.01)
*F24H 15/36* (2022.01)
*F24H 15/429* (2022.01)
*G05B 15/02* (2006.01)
*F24H 15/281* (2022.01)

(56) References Cited

U.S. PATENT DOCUMENTS

| | | | | |
|---|---|---|---|---|
| 6,410,842 | B1 * | 6/2002 | McAlonan | H10N 10/00 |
| | | | | 431/79 |
| 9,605,871 | B2 | 3/2017 | Schultz et al. | |
| 2008/0124667 | A1 * | 5/2008 | Schultz | F23N 5/203 |
| | | | | 236/11 |
| 2013/0110413 | A1 * | 5/2013 | Schork | G01K 13/02 |
| | | | | 702/24 |
| 2016/0109892 | A1 * | 4/2016 | Johnson | G05B 15/02 |
| | | | | 700/300 |

FOREIGN PATENT DOCUMENTS

| | | | |
|---|---|---|---|
| JP | 03556481 B2 | | 8/2004 |
| JP | 3124870 U | * | 8/2006 |
| JP | 0400731002 B2 | | 4/2008 |

* cited by examiner

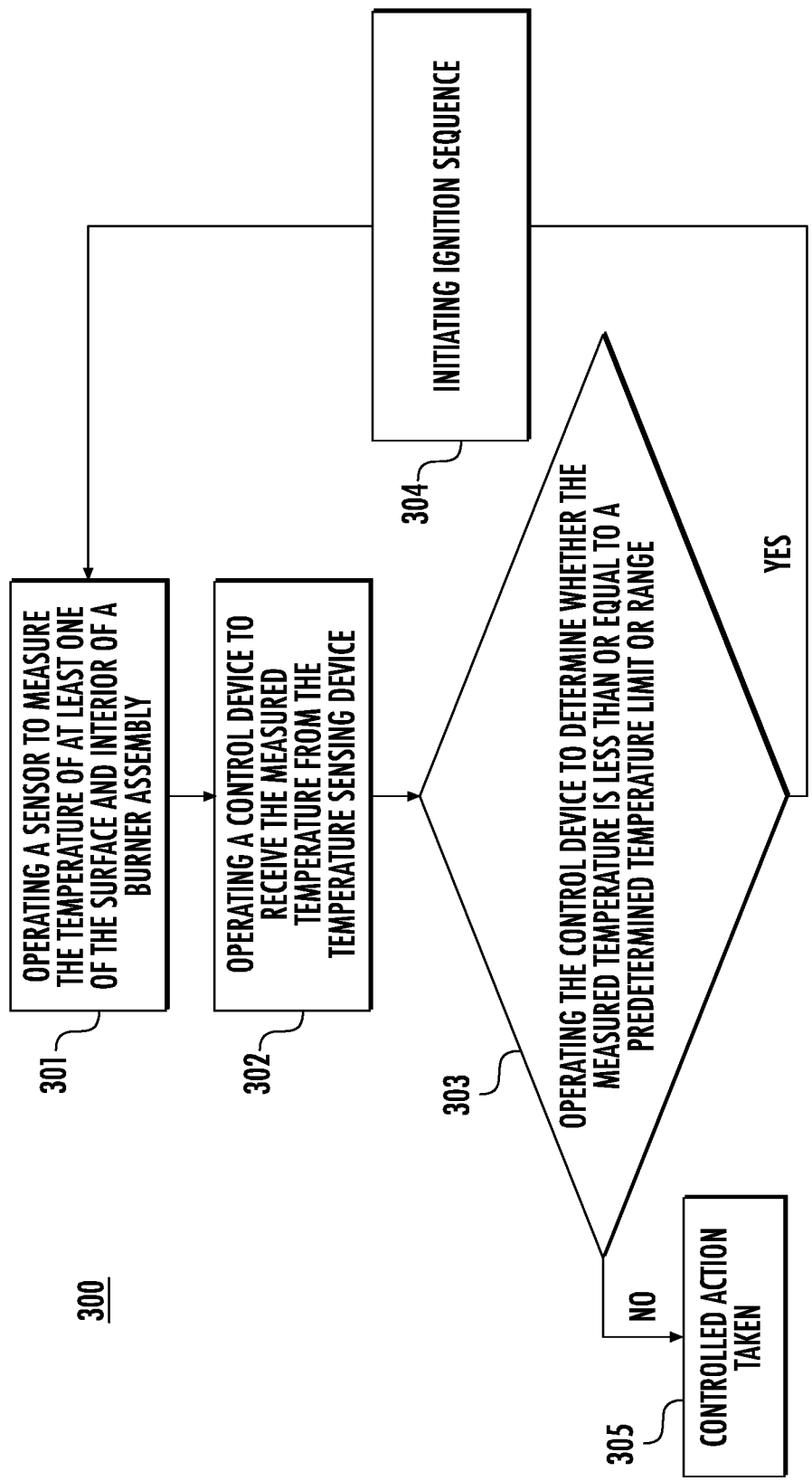

METHOD, SYSTEM AND TEMPERATURE CONTROL OF A HEATING, VENTILATION AND AIR CONDITIONING UNIT

CROSS REFERENCE TO A RELATED APPLICATION

The application claims the benefit of U.S. Provisional Application No. 62/963,401 filed Jan. 20, 2020, the contents of which are hereby incorporated in their entirety.

BACKGROUND

The subject matter disclosed herein generally relates to heating, ventilation, and air conditioning (HVAC) systems, and more particularly to a method, system and control of an HVAC unit using one or more sensors for detecting temperature of an HVAC unit.

HVAC systems, including conventional furnaces and boilers, cycle on and off to maintain a desired temperature within a comfort space, i.e., within a building interior. Pre-mix combustion systems, such as the ones typically found on low nitrogen oxide (NOx) furnaces, frequently experience an objectionable phenomenon caused by thermo acoustic vibrations, which is customarily referred to as combustion resonance. This effect, when present in the audible range, gives rise to a screaming, howling or singing noise or tone emanating from a HVAC system which may occur during combustion or upon a hot or cold ignition start and may cause occupant discomfort. The physical explanation for the generation of an audible resonance effect is not definitely known. A number of solutions have been directed to mechanical design of various aspects of an HVAC system. These varied mechanical solutions have not proved satisfactory, due in part to the elusive nature of the problem, and the large number of possible changes and combinations that one might make to a mechanical system.

What is needed then, is a different approach. One that considers the problem of combustion resonance from the perspective of an HVAC system's operational characteristics, rather than as a purely mechanical problem to be solved. Eliminating or reducing occurrence of combustion resonance may improve user comfort. Examples of a control device, system and method for controlling an HVAC heating apparatus relevant to the needs existing in the field are discussed below.

BRIEF DESCRIPTION OF THE INVENTION

According to one non-limiting embodiment, a system for controlling the temperature of a heating apparatus having an inducer assembly, a blower assembly, the system including: a burner assembly operably coupled to at least one of a gas valve assembly, a temperature sensing device, an igniter, a flame sensing device; a control device in communication with the temperature sensing device, and at least one of the burner assembly, the inducer assembly, the blower assembly and the gas valve assembly, the control device configured to: operate at least one temperature sensing device to measure the temperature of at least one of a surface of and an interior of the burner box; receive the temperature measurement from the at least one temperature sensing device; compare the temperature measurement to a predetermined temperature limit and determine whether the measured temperature is greater than the predetermined temperature limit; and perform at least one controlled action if the measured temperature is greater than the predetermined temperature limit.

In addition to one or more of the features described above, or as an alternative, in further embodiments, the system for controlling the temperature of a heating apparatus wherein a controlled action comprises at least one of initiating, terminating and adjusting the operation of, at least one of the blower assembly, the inducer assembly, the gas valve assembly and the igniter.

In addition to one or more of the features described above, or as an alternative, in further embodiments, a system for controlling the temperature of a heating apparatus wherein the temperature sensing device is a thermistor.

In addition to one or more of the features described above, or as an alternative, in further embodiments, a system for controlling the temperature of a heating apparatus wherein the heating apparatus comprises a furnace.

According to one non-limiting embodiment, a control device for a heating apparatus, the heating apparatus including a temperature sensing device operably coupled to a burner assembly, the control device including: a memory configured to store at least one predetermined temperature limit or range; a processor operably coupled to the memory, wherein the processor is configured to: receive a temperature measurement from the temperature sensing device; compare the measured temperature from the temperature sensing device to the at least one predetermined temperature limit or range; and operate in at least one operational mode based at least in part on the difference between the measured temperature and the at least one predetermined temperature limit or range.

In addition to one or more of the features described above, or as an alternative, in further embodiments, a control device for a heating apparatus wherein the at least one operational mode includes operating a blower assembly of the heating apparatus for a period of time when the measured temperature is greater than the at least one predetermined temperature limit or range.

In addition to one or more of the features described above, or as an alternative, in further embodiments, a control device for a heating apparatus wherein the at least one operational mode includes operating an inducer assembly of the heating apparatus for a period of time when the measured temperature is greater than the at least one predetermined temperature limit or range.

In addition to one or more of the features described above, or as an alternative, in further embodiments, a control device for a heating apparatus, wherein the at least one operational mode includes at least one of initiating, terminating and adjusting the amount of fuel delivered by a gas valve assembly when the measured temperature is greater than at least one predetermined temperature limit or range.

In addition to one or more of the features described above, or as an alternative, in further embodiments, a control device for a heating apparatus, wherein the at least one operational mode includes at least one of initiating, terminating and adjusting an ignition sequence when the measured temperature is greater than at least one predetermined temperature limit or range.

In addition to one or more of the features described above, or as an alternative, in further embodiments, a control device for a heating apparatus, wherein the heating apparatus includes a furnace.

According to one non-limiting embodiment, a method of controlling the temperature within a heating apparatus for reducing or eliminating combustion resonance, the method including: measuring a temperature of a heating apparatus; comparing the measured temperature of a heating apparatus with a predetermined temperature limit or range; determining whether the measured temperature of a heating apparatus is greater than a predetermined temperature limit or range; performing a controlled action if the measured temperature of a heating apparatus is greater than the predetermined temperature limit or range.

In addition to one or more of the features described above, or as an alternative, in further embodiments, a method of controlling the temperature within a heating apparatus for reducing or eliminating combustion resonance, the method including the step of measuring a temperature of the heating apparatus, including measuring a temperature of at least one of a burner assembly, an inducer assembly and a blower assembly.

In addition to one or more of the features described above, or as an alternative, in further embodiments, a method of controlling the temperature within a heating apparatus for reducing or eliminating combustion resonance, wherein a controlled action includes at least one of initiating, terminating and adjusting one or more of a burner assembly, inducer assembly, a blower assembly.

In addition to one or more of the features described above, or as an alternative, in further embodiments, a method of controlling the temperature within a heating apparatus for reducing or eliminating combustion resonance, wherein taking a controlled action further includes at least one of initiating, terminating and adjusting a gas valve assembly.

In addition to one or more of the features described above, or as an alternative, in further embodiments, a method of controlling the temperature within a heating apparatus for reducing or eliminating combustion resonance, wherein taking a controlled action further includes at least one of initiating, terminating and adjusting an ignition sequence.

BRIEF DESCRIPTION OF THE DRAWINGS

The accompanying drawings form a part of the specification. Throughout the drawings, like reference numbers identify like elements.

FIG. 3 illustrates a method for controlling the temperature of a burner assembly in accordance with embodiments of the disclosure.

DETAILED DESCRIPTION OF THE INVENTION

As will be described in greater detail below the present disclosure provides for controlling a heating apparatus using a predetermined temperature limit or range to reduce or eliminate combustion resonance. It should be evident to one skilled in the art that the present disclosure is not limited to the specific examples given.

This disclosure provides for a means of reducing or eliminating combustion resonance during ignition and start-up operation. Maintaining the temperature of a heating apparatus 100 within a predetermined temperature limit or range improves operation, and may be used to control or eliminate an unwanted resonance characteristic. Resonance may occur during hot or cold ignition start, or during combustion of the fuel source. A controller can be utilized for sensing heat from combustion or sensing residual heat within a heating apparatus, and then control whether or when to commence ignition. Combustion and residual heat within a heating apparatus 100 affects the properties of air, mainly density, flow rate, and velocity, that may contribute to the conditions for producing combustion resonance. These control techniques may be used in combination with other mechanical techniques and device solutions as required to control combustion resonance where temperature alone may not fully account for eliminating the resonance. Examples of mechanical means of resonance control include air restrictors, resonators, changing chamber volumes, modifying flow paths and velocities.

Figure 1:
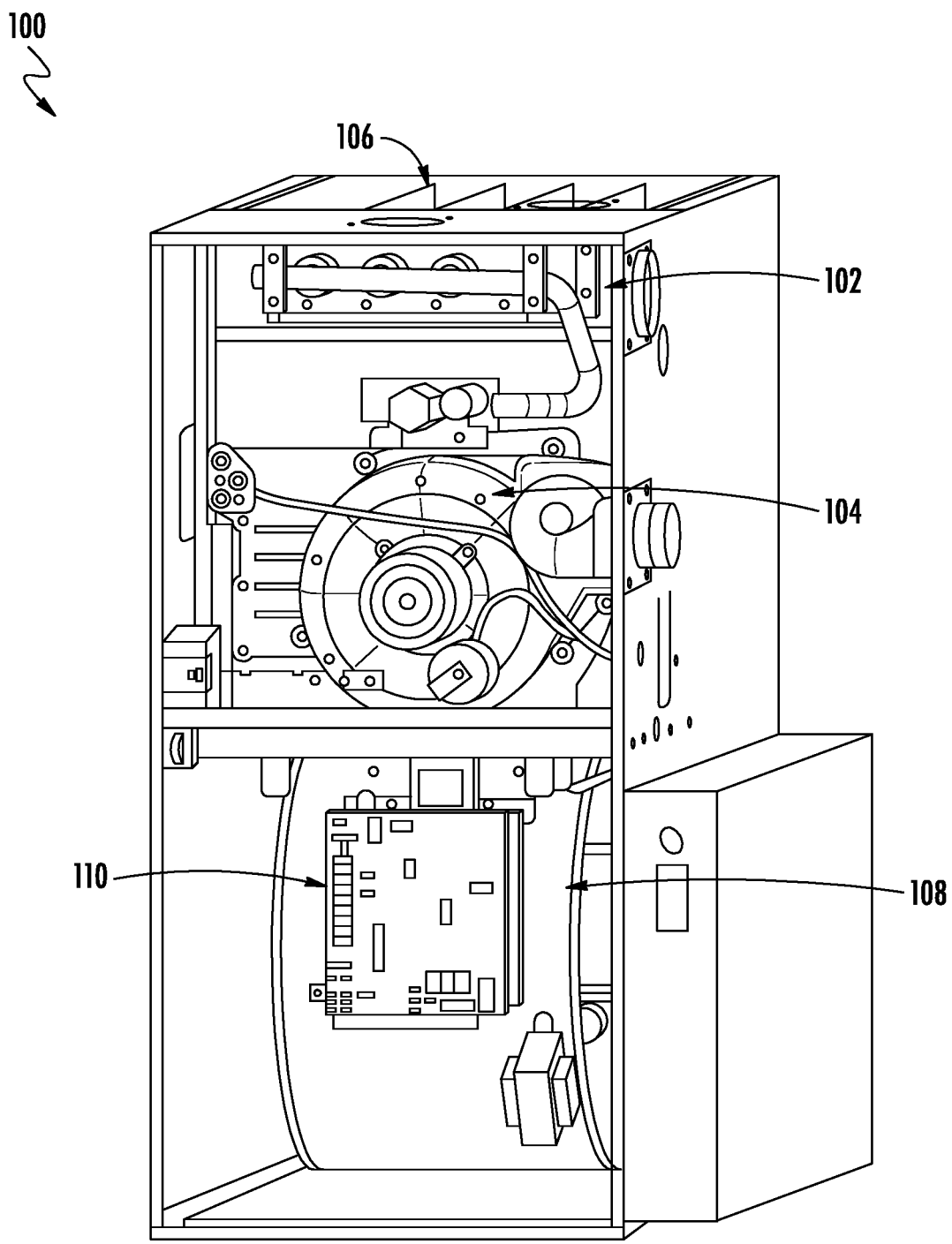
FIG. 1 is a perspective view of a portion of a furnace assembly in accordance with embodiments of the disclosure.

Referring to FIG. 1, a heating apparatus 100 is generally shown. In one non-limiting embodiment, the heating apparatus 100 is a gas furnace used to condition air to an interior space. Operation of the heating apparatus 100 is controlled by control device 110. For example, when the air temperature within the interior space is less than a desired temperature by a user, a signal (generally from a thermostat) is sent to the control device 110 to operate the heating apparatus 100 in a heating cycle to raise the temperature within the interior space.

Figure 2:
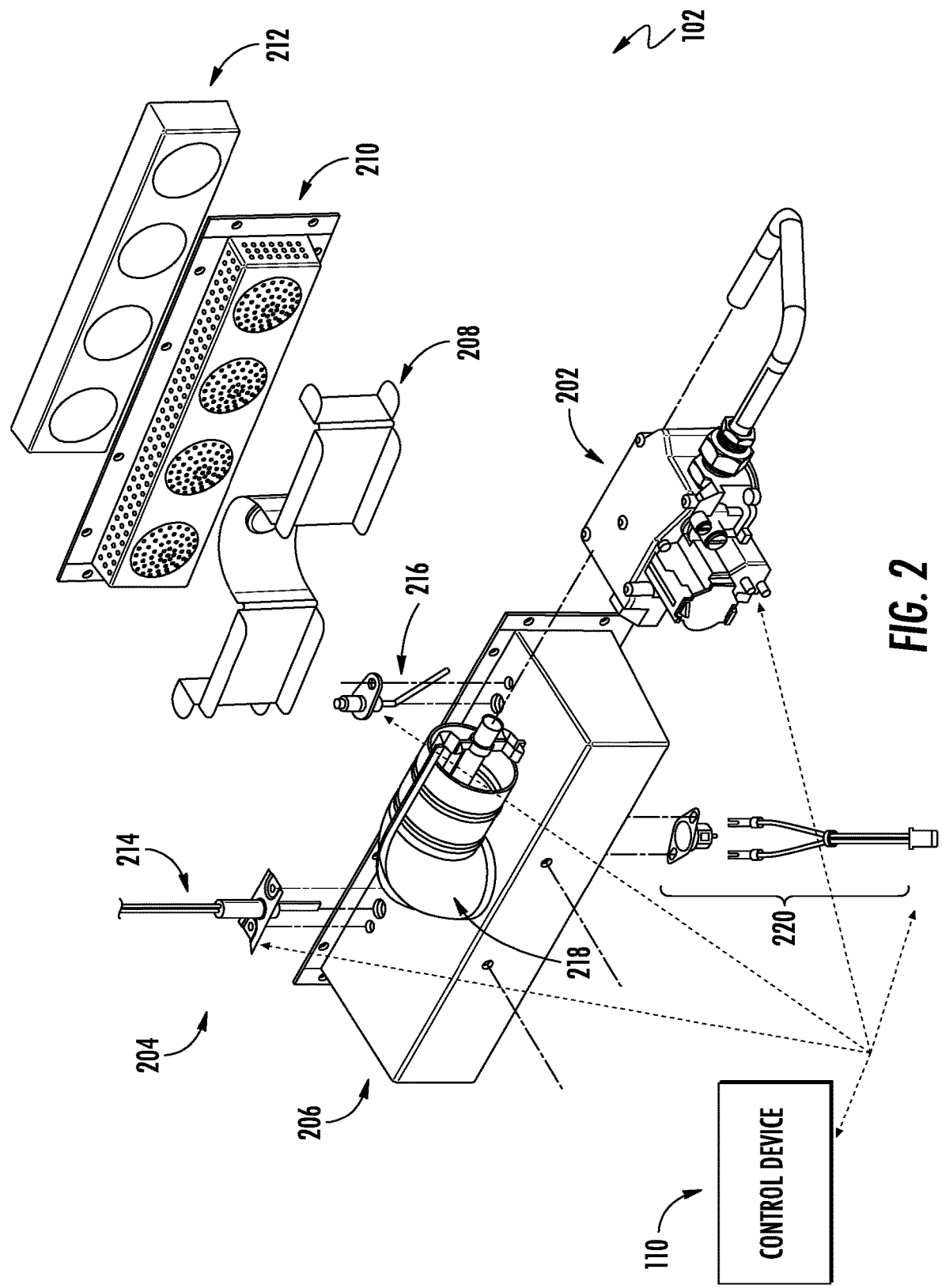
FIG. 2 is an exploded perspective view of a burner assembly in accordance with embodiments of the disclosure.

The heating apparatus 100 includes a burner assembly 102, an inducer assembly 104, a heat exchanger 106, a blower assembly 108 and a control device 110. The burner assembly 102, operably coupled to the heat exchanger 106, also includes a gas valve assembly (FIG. 2, 202). The gas valve assembly supplies fuel to the burner assembly 102 as described below. The inducer assembly 104 includes an inducer motor and fan which supplies air to the burner assembly for combustion.

Burner assembly 102 (including the gas valve assembly (FIG. 2, 202)) and the inducer assembly, are configured to create and ignite a fuel/air mixture in the burner assembly 102. As the ignited fuel air/mixture combusts, the heat exchanger 106 surface becomes hot and transfers its heat into passing air. The blower assembly 108 directs air across the hot heat exchanger 106, forcing heated air through ducting to heat the interior space.

Now referring to FIG. 2, an exploded perspective view of burner assembly 102 is shown. The burner assembly 102 includes gas valve assembly 202 operably coupled to a burner box assembly 204. The burner box assembly 204 includes an outer burner box 206, an interior baffle 208, an inner burner 210, burner mesh 212, an igniter 214 for generating a flame, and a flame sensing device 216, each operably coupled to the burner box assembly 204. Generally, a flame for combustion is generated when a fuel/air mixture, passes through inlet elbow 218 and enters the interior cavity of the outer burner box 206. The burner box assembly 202 receives fuel for combustion is supplied by the gas valve assembly 202, and air for combustion from the inducer assembly 104. The fuel/air mixture is directed by an interior baffle 208 and permeates into the inner burner 210 where it is ignited by igniter 214. The flame sensing device 216 is operable to verify the ignition of the fuel/air mixture, and that the flame is consistent.

The burner assembly 102 also includes a temperature sensing device 220 operably coupled to the outer burner box 206, for measuring at least one of an interior or exterior temperature of burner box assembly 204. In one non-limiting embodiment, the temperature sensing device 220 is a thermistor. The temperature sensing device 220 may be further configured to transmit the measured temperature to the control device 110 so that the control device 110 may take a control action (discussed below) based at least in part on the measured temperature compared to a predetermined temperature limit or range.

Temperature sensing device 220 may be of any type, for example, an NTC (negative coefficient) or PTC (positive temperature coefficient), providing real-time feedback in a closed loop system. It will further be appreciated that the temperature sensing device 220 is shown positioned on the bottom exterior surface of burner box assembly 204; however, temperature sensing device 214, may be placed anywhere along any exterior or interior surface of burner box assembly 204 or its components therein.

Control device 110 may be in communication with at least one of the inducer assembly 104, the blower assembly 108, the temperature sensing device 220, the igniter 214, and flame sensing device 216. As discussed further below, control device 110 may be configured to monitor and control temperature of heating apparatus 100, which may result in eliminating or reducing resonance combustion. For example, control device 110 in communication with sensing device 220 and may be configured to monitor and control the temperature of burner assembly 102 based upon comparing the measured temperature of burner assembly 102 to at least one predetermined temperature limit or range, and operating in a variety of modes in order to reduce the temperature within the burner assembly 102 to an accepted limit or range. In another non-limiting embodiment, control device 110 may be configured to control the gas valve assembly 202 and/or inducer assembly 104, to supply a fuel/air mixture to burner assembly 102 as a means for controlling temperature of the heating apparatus 100. In another non-limiting example, control device 110 may be configured to control an ignition sequence as a means for controlling temperature.

Referring to FIG. 3, a method 300 for controlling combustion resonance of a heating apparatus 100 is disclosed. The method 300 includes step 301 of operating at least one temperature sensing device 220 to measure the temperature of a heating apparatus 100. In one non-limiting embodiment, method 300, may include a control device that receives a signal (typically from a thermostat) indicating that heat is required in the conditioned space. At 301, the temperature to be measured may be at least one of an interior surface of a heating apparatus and/or an exterior surface of a heating apparatus. For example, one or more sensors may be coupled to an interior or exterior surface of a burner assembly for measuring surface temperature. In an alternate embodiment, the control device may be configured to receive a signal from one or more temperature sensors on any interior or exterior surface of a heating apparatus to measure one or more temperatures representative of residual heat in the heating apparatus. For example, one or more temperature sensors may be located, on a heat exchanger or inducer assembly.

At 302 of the method, the control device receives at least one measured temperature of a heating apparatus (e.g., a surface temperature of a burner box). In the next step 303, the measured temperature is compared to a predetermined temperature limit or range. If the measured temperature is less than or equal to a predetermined limit or range, the control device may initiate an ignition sequence at step 304 since under these conditions, combustion resonance is unlikely to occur.

However, if the condition at step 303 is not met, the control device may be configured to initiate, modify, continue or terminate one or more controlled actions in step 305 until the measured temperature is less than or equal to a predetermined temperature limit or range. For example, a control action at step 305 may include energizing at least one of an inducer assembly and/or blower assembly to move air across a heat exchanger and through a burner assembly to cool all surfaces.

In another non-limiting embodiment, a controlled action may include adjusting the fuel/air mixture (e.g., adjusting the amount of fuel and/or air delivered to the burner box assembly); initiating or resuming an ignition sequence when the temperature of a burner assembly is within a predetermined limit; and/or delaying a control action for a fixed or variable amount of time.

In addition to one or more of the features described above, or as an alternative, in further embodiments, the method may include using measured temperature for initiating, modifying or terminating an ignition sequence based on air/fuel mixture conditions. The temperature of a heating apparatus may vary depending on air/fuel mixture conditions. Under normal operating conditions, a heating apparatus may have well-controlled ignition characteristics at a given air/fuel ratio at ignition, and actions for ensuring the temperature of the heating apparatus are low may not be necessary. However, over the life of the heating apparatus or due to environmental conditions, such as low appliance voltage or lower input gas pressure, the conditions for any ignition may become unfavorable. This may lead to operating conditions in which a richer air/fuel mixture can result, and in turn may lead to higher than normal operating temperatures. Higher operating temperatures over time, may lead to decreased operating efficiency, greater carbon dioxide or nitrogen oxide emissions, or damage to an HVAC unit, and a higher probability that combustion resonance will occur. The method may include a control device configured to alter the air/fuel ratio by means of the gas valve assembly, and therefore affect an ignition sequence, based on the number of successful or failed attempts to ignite the flame for heating.

In another non-limiting embodiment, the mechanical means of controlling combustion resonance may or may not be well controlled during normal ignition sequences. Examples of mechanical means of resonance control include air restrictors, resonators, changing chamber volumes, modifying flow paths and velocities. If a mechanical means adequately controls combustion resonance during normal ignition or start-up sequences, a controlled action may only be necessary when abnormal ignition conditions are detected. For example, the control device may receive a signal to operate and immediately begin an ignition sequence. However, under certain conditions (e.g., environmental conditions or changes in operation of the furnace), a burner may not ignite on a first attempt and the ignition sequence may restart. In general, product safety standards may require the control device prove successful combustion within a limited number of ignition attempts, before requiring a lockout period during which the heating apparatus is idle and does not heat the interior space. In this example, the method may include as an initial step, following one or more failed attempts to ignite combustion, a controlled action for enriching the air/fuel mixture by controlling the gas valve assembly, to increase the likelihood of a successful ignition.

It can be appreciated that the control device may return to a normal ignition sequence on subsequent ignition attempts, may continue to ignite at a richer fuel/air mixture condition, or may operate under a combination as may be necessary to avoid reliability concerns or long durations without heating the interior space.

The method may also include a control device configured to alter the air/fuel ratio and therefor an ignition sequence, based on the temperature of a heating apparatus during heating operation. Temperatures measured during the heating operation of the heating apparatus can determine if combustion operating conditions are higher or lower than a predetermined normal range. Operating temperatures above the predetermined limits indicate that the air/fuel ratio is rich; igniting at such a condition is more likely to emit combustion resonance.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

I claim:

1. A system for controlling the temperature of a heating apparatus having an inducer assembly, a blower assembly, the system comprising:
   a burner assembly comprising a burner box and operably coupled to at least one of a gas valve assembly, a temperature sensing device, an igniter, and a flame sensing device; and
   a control device comprising a processor operably coupled to a memory, the memory configured to store at least one predetermined temperature limit or range, the control device in communication with the temperature sensing device, and at least one of the burner assembly, the inducer assembly, the blower assembly and the gas valve assembly, the processor of the control device configured to:
      operate at least one temperature sensing device to measure the temperature of at least one of an interior surface of the burner box and an exterior surface of the burner box;
      receive the temperature measurement from the at least one temperature sensing device;
      compare the temperature measurement to the at least one predetermined temperature limit or range and determine whether the measured temperature is greater than the at least one predetermined temperature limit or range; and
      perform at least one controlled action if the measured temperature is greater than the at least one predetermined temperature limit or range, wherein the at least one controlled action comprises operating the inducer assembly of the heating apparatus for a period of time.

2. The system of claim 1 wherein the at least one controlled action comprises at least one of initiating, terminating and adjusting the operation of, at least one of the blower assembly, the inducer assembly, the gas valve assembly and the igniter.

3. The system of claim 1, wherein the temperature sensing device is a thermistor.

4. The system of claim 1, wherein the heating apparatus comprises a furnace.

5. A control device for a heating apparatus, the heating apparatus including a temperature sensing device operably coupled to an outer burner box for measuring at least one of an interior or exterior temperature of a burner box assembly, the control device comprising:
   a memory configured to store at least one predetermined temperature limit or range;
   a processor operably coupled to the memory, wherein the processor is configured to:
      receive a temperature measurement from the temperature sensing device;
      compare the measured temperature from the temperature sensing device to the at least one predetermined temperature limit or range; and
      operate in at least one operational mode based at least in part on the difference between the measured temperature and the at least one predetermined temperature limit or range, wherein the at least one operational mode comprises operating an inducer assembly of the heating apparatus for a period of time when the measured temperature is greater than the at least one predetermined temperature limit or range.

6. The control device of claim 5, wherein the at least one operational mode comprises operating a blower assembly of the heating apparatus for a period of time when the measured temperature is greater than the at least one predetermined temperature limit or range.

7. The control device of claim 5, wherein the at least one operational mode comprises at least one of initiating, terminating and adjusting the amount of fuel delivered by a gas valve assembly when the measured temperature is greater than at least one predetermined temperature limit or range.

8. The control device of claim 5, wherein the at least one operational mode comprises at least one of initiating, terminating and adjusting an ignition sequence when the measured temperature is greater than at least one predetermined temperature limit or range.

9. The control device of claim 8, wherein the heating apparatus comprises a furnace.

10. A method of controlling the temperature within a heating apparatus for reducing or eliminating combustion resonance, the heating apparatus having an inducer assembly, a blower assembly, and a burner assembly, the method comprising:
    storing, via a memory at least one predetermined temperature limit or range;
    measuring, with a temperature sensing device operably coupled to an outer burner box of the burner assembly a temperature of at least one of an interior surface of the burner box of the burner assembly and an exterior surface of the burner box;
    comparing, via a processor operably coupled to the memory, the measured temperature of the burner box in the heating apparatus with the at least one predetermined temperature limit or range;
    determining, via the processor, whether the measured temperature of the burner box in the heating apparatus is greater than the at least one predetermined temperature limit or range; and
    performing, via the processor, a controlled action if the measured temperature of the burner box in the heating apparatus is greater than the at least one predetermined temperature limit or range, wherein the controlled action includes operating the inducer assembly of the heating apparatus for a period of time.

11. The method of claim 10, wherein the controlled action includes at least one of initiating, terminating and adjusting one or more of the burner assembly, the inducer assembly, and the blower assembly.

12. The method of claim 11, wherein the controlled action further includes at least one of initiating, terminating and adjusting a gas valve assembly.

13. The method of claim 11, wherein the controlled action further includes at least one of initiating, terminating and adjusting an ignition sequence.

\* \* \* \* \*